(No Model.) 2 Sheets—Sheet 1.
A. V. MESEROLE.
GALVANIC BATTERY.
No. 386,149. Patented July 17, 1888.
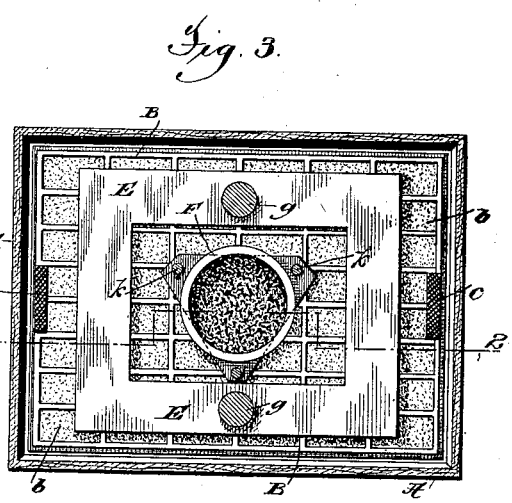
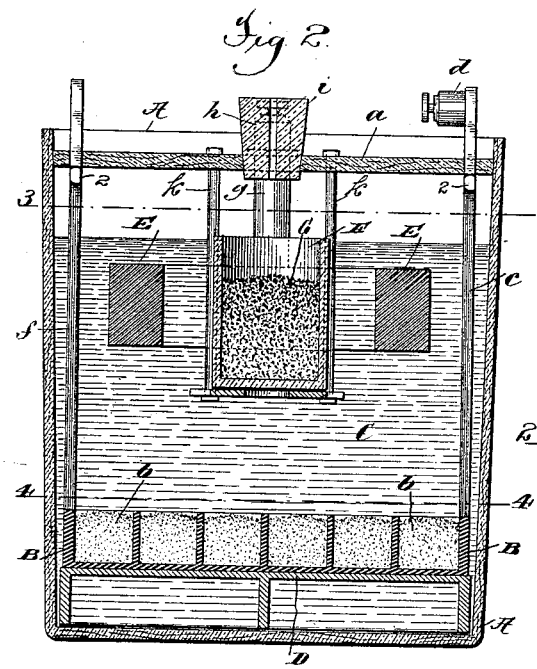
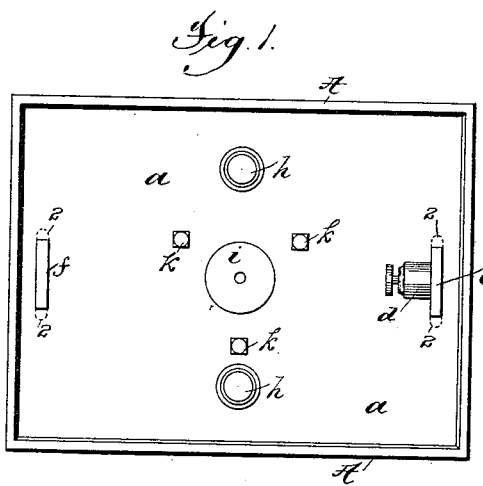
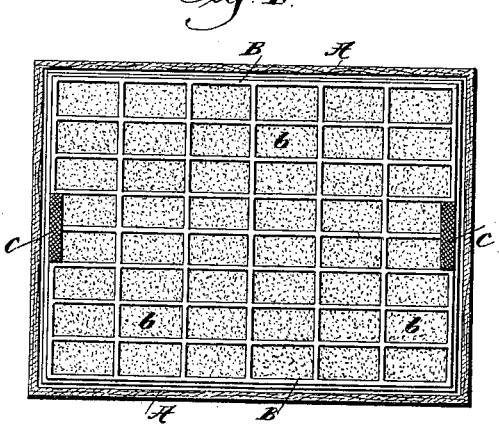
Attest:
Geo. H. Potts.
James J. Kennedy.
Inventor:
Abraham V. Meserole,
by Philipp, Philipp & Hovey.
Attys.

(No Model.) 2 Sheets—Sheet 2.

A. V. MESEROLE.
GALVANIC BATTERY.

No. 386,149. Patented July 17, 1888.

UNITED STATES PATENT OFFICE.

ABRAHAM V. MESEROLE, OF NEW YORK, N. Y.

GALVANIC BATTERY.

SPECIFICATION forming part of Letters Patent No. 386,149, dated July 17, 1888.

Application filed October 28, 1887. Serial No. 253,631. (No model.)

*To all whom it may concern:*

Be it known that I, ABRAHAM V. MESEROLE, a citizen of the United States, residing at New York, county of New York, and State of New York, have invented certain new and useful Improvements in Galvanic Batteries, fully described and represented in the following specification and the accompanying drawings, forming a part of the same.

This invention relates to the class of batteries known as "galvanic" or "primary" batteries.

The primary object of the invention is to provide a battery which shall combine the advantages of a so called "open-circuit" or "sal-ammoniac" battery with those of a closed-circuit or copper-sulphate battery—that is to say, a battery in which there is little or no action when the circuit is open and the battery idle, and which will not readily polarize when the circuit is closed and the battery doing work.

Another object of the invention is to secure economy by employing comparatively inexpensive chemicals of a harmless nature and in solid form, and which will produce a residual product having a commercial value, and which will render unnecessary the expensive and troublesome amalgamation of the zinc electrode.

Other features of the invention relate more particularly to the mechanical construction of the battery, and have for their object the production of a battery which shall give an effective and constant volume of current such as is required for small electric motors and for electric lighting.

As a full understanding of the invention can be best given by an illustration and a description of a battery embodying the same, all further preliminary description will be omitted and a detailed description given, reference being had to the accompanying drawings, in which—

Figure 5:
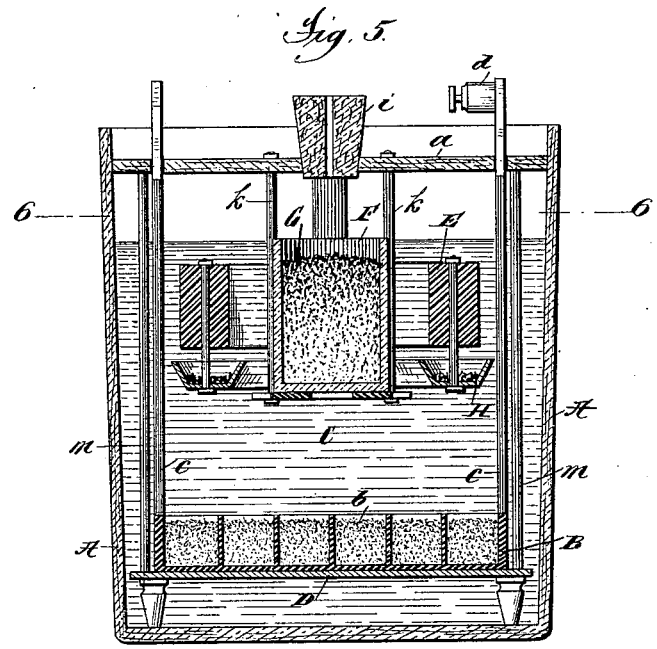
Figure 6:
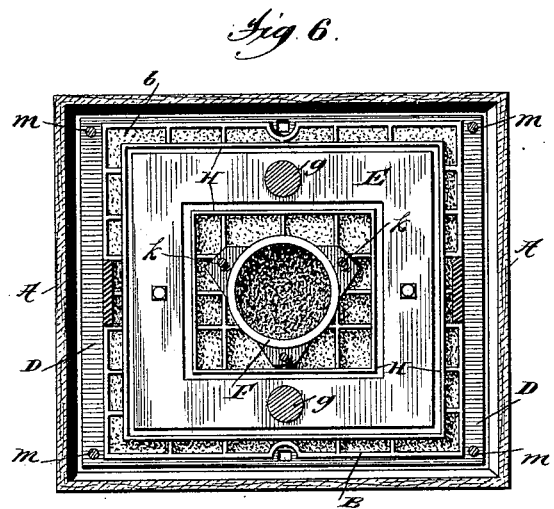

Figure 1 is a plan view of a battery—or, more properly, one cell of a battery—constructed and operating according to the present invention. Fig. 2 is a vertical section of the cell taken on the line 2 of Fig. 3. Figs. 3 and 4 are horizontal sections taken, respectively, on the lines 3 and 4 of Fig. 2. Fig. 5 is a view similar to Fig. 2, illustrating certain modifications which will be hereinafter referred to, and Fig. 6 is a horizontal section taken on the line 6 of Fig. 5.

Referring now particularly to Figs. 1 to 4, the mechanical construction and organization of the battery will be first described. The cup A is of any convenient form and size and is made of any of the materials commonly employed for such purposes. The copper electrode B is provided with a large number of cells or cavities for containing the depolarizing material $b$, and is preferably arranged in a horizontal or substantially horizontal position in order to better retain this material in the cells. By making the copper electrode of this cellular form the depolarizing material is brought into contact with the electrode at many points, which insures the more effective action of the depolarizer when the battery is doing work. This construction also provides a large surface—the upper edges of the cells not being covered by the depolarizer—for contact with the exciting-fluid C, which aids in the collecting and conducting of the current and reduces the internal resistance of the battery.

To reduce the weight, particularly in cells of large size, the walls of the electrode B are made quite thin, and it is supported on a table or platform, D, which fits into the bottom of the cell, as shown. The table does not entirely fill the bottom of the cell, so that the exciting-fluid is permitted to circulate beneath it, and the space thus provided beneath the table serves as a chamber beneath the electrode, into which the heavy salts of zinc formed in the operation of the battery will settle and be prevented from crystallizing on the copper electrode, which would interfere with the proper working of the battery. In cells of small size the copper electrode may be provided with legs which will take the place of the table D. The electrode B is provided with a vertical conducting-standard, $e$, which extends to the top of the cell, and is provided with the usual binding-screw, $d$, for one wire of the circuit; and for convenience in removing and replacing the electrode it is preferably provided at its opposite side with a similar standard, $f$. As shown in Figs. 1 to 4, these two standards are provided near their upper ends with shoulders 2, which serve to support the cover *a* of the cell, which fits snugly into the upper end of the cup A; or the cover may be supported in any other suitable manner, as by cleats or hangers.

The zinc electrode E is preferably made of annular form or in the form of a hollow square, as shown, and is suspended by rods *g* from the cover *a* in position to be immersed in the exciting-fluid C. One of the rods *g* is provided with a binding screw, *h*, for the other wire of the circuit.

Suspended from the cover *a* and in position to be immersed in the exciting-fluid is a porous pot, F, which contains a quantity of the exciting chemical or zinc solvent G, (chloride of ammonium or sodium.) The cover above the pot F is provided with an opening which is closed by a removable plug or cap, *i*, and through which the supply of the chemical in the pot can be replenished from time to time without disturbing the other parts of the battery or interrupting its action. The pot F is suspended in the case shown by means of rods *k* depending from the cover *a*; but it may be supported in any other suitable manner that may be found most convenient. The porous pot or receptacle F being immersed or partly immersed in the fluid C at or near the top of the cell, the salt contained in the pot will, by the action known as "dialysis," be slowly diffused through the pores of the pot and pass into the fluid C, thus keeping it at the proper strength.

It is important that the porous pot should be suspended near the top of the cell, so that the exciting chemical diffused through the walls of the pot will enter the upper portion of the exciting-fluid, and thus be diffused through the fluid as it settles to the bottom of the cell. If the pot were near the bottom of the cell, the chemical diffused through its walls, being heavy, would remain at the bottom of the cell and not be diffused through the whole volume of the exciting-fluid.

The term "porous" as herein used is not to be understood as including perforations or openings such as those of wire-gauze or other fabric, or the like, but as meaning pores proper, or the capillary pores of such material as terra-cotta and the like. The function performed by this porous pot F should not be confounded with the function performed by a porous pot or receptacle as ordinarily employed where one electrode is placed within the pot containing the exciting or depolarizing chemical.

It is to be remarked that in practice the size and the distance apart of the zinc and copper electrodes will be varied to suit the work which the battery is to perform. The copper electrode will preferably be cast in a single piece, and the zinc will be cast of proper form to secure the necessary surface and volume. The cup A of the cell will preferably be slightly flaring, and may be made of glass, rubber, or of the prepared paper-ware now in common use.

In some cases it will be desirable—particularly where the battery has to stand idle for considerable periods—to provide a shallow trough or pan, as H, which will be suspended beneath the zinc electrode, as shown in Figs. 5 and 6, in position to receive any scale or sediment which may fall from that electrode. This pan may be made of rubber or other suitable material, and may be supported in any convenient manner, as by rods extending from the zinc electrode. In some cases also it may be desirable to provide the table or support D with vertical posts, as *m*, as also shown in Figs. 5 and 6, which will serve to support the cover *a*. This will permit the standards *c f* to be made lighter and will be an advantage particularly in large-sized cells.

The exciting fluid C is a chlorine solution formed by dissolving chloride of ammonium, or chloride of sodium, or a mixture of the two, in water, the salt to be dissolved being contained in the pot F, and passing through the porous walls of the pot as it is required to keep up the strength of the solution. Zinc is passive in this fluid without being amalgamated, and as a consequence very little action takes place when the battery is not doing work.

The depolarizing agent *b* is composed of a mixture of hydrate, carbonate, and oxide of copper, made, preferably, by dissolving low grades of sulphate of copper, which contain a variable proportion of the oxidized metal in water, and then adding a sufficient quantity of a mixture of the alkaline carbonate of soda, which contains also a proportion of the alkaline hydrate of soda to effect the precipitation of the copper compounds, or the same result may be effected by adding to the copper solution a mixture of the alkaline hydrate and bicarbonate of soda. The alkaline soda combines with the sulphuric acid of the sulphate of copper, forming sulphate of soda, and the copper compounds are precipitated in the form of a powder, which is insoluble in water. Other salts or ores of copper may be treated with the alkaline-soda mixture in the same manner to produce the depolarizer, but I prefer to use the crude sulphate. In some cases the depolarizing agent may be produced by making a mechanical mixture of the ingredients, and in some cases it may be of advantage to combine with them powdered or granulated carbon to increase the electrical conductivity and activity of the depolarizer, and such modifications are to be regarded as coming within the scope of the invention. The soda compounds in combining with the sulphuric acid of the copper sulphate, as before stated, produce sulphate of soda as a residual product, and this is readily salable, thus reducing the cost of the depolarizing agent. The depolarizing agent thus produced is neutral or passive when the battery is not doing work; but when the battery is at work the oxygen of the depolarizing agent combines with the nascent hydrogen formed on the copper electrode and the copper is reduced to a metallic condition.

The action on the zinc electrode is the same as in other chlorine batteries, such as to form chloride of zinc, which enters into the solution and gradually settles to the bottom of the cell. The residual products of the battery are therefore metallic copper and chloride of zinc, both of which have a commercial value and are readily marketable, thus reducing the cost of maintaining the battery.

I have found that the battery which has been described combines all the necessary qualities for actual work, and is far more effective and reliable than any of the known forms of copper-sulphate or sal-ammoniac batteries.

I am aware that various compounds of copper have been used in galvanic batteries, but it has never, so far as I am aware, been proposed to use the depolarizing compound described, which in actual use appears to more readily part with its oxygen than does a pure sulphate or carbonate. This is shown by the greater energy of the battery—that is to say, the electrolytic action is more energetic in this battery than in ordinary copper compound batteries.

In conclusion, it is to be remarked that the cellular form of the copper or negative electrode may be employed with good effect in other classes of primary batteries, and in such cases it may be made of carbon or an alloy of antimony and lead. This method of supplying the exciting chemical by means of the porous pot can also be employed with advantage in other classes of batteries, or where other chemicals are employed as the exciting agent.

What I claim is—

1. A depolarizing agent or material for galvanic batteries, containing hydrate and oxide of copper, substantially as described.

2. A depolarizing agent or material for galvanic batteries, consisting of a mixture of carbonate, hydrate, and oxide of copper, substantially as described.

3. A depolarizing agent or material for galvanic batteries, consisting of a mixture of carbonate, hydrate, and oxide of copper and granulated carbon, substantially as described.

4. A depolarizing agent or material for galvanic batteries, containing hydrate of copper, substantially as described.

5. The combination, with the positive and negative electrode of a galvanic battery, of the exciting chlorine solution and the depolarizing agent or material consisting of a mixture of carbonate, hydrate, and oxide of copper, substantially as described.

6. In a galvanic battery, the combination, with the positive and negative electrodes, and the exciting-fluid, of the porous pot or receptacle F, suspended near the top of the cell, for containing a supply of the exciting chemical, and arranged to allow said chemical to gradually pass into the upper portion of the fluid by dialysis, substantially as described.

7. In a galvanic battery, the combination, with the positive electrode and the exciting-fluid, of the horizontally-arranged negative electrode having cells for containing the depolarizer, and the platform D, supporting said negative electrode a distance from the bottom of the cell, whereby a chamber is formed beneath said negative electrode, substantially as described.

8. In a galvanic battery, the combination, with the positive electrode, of the trough suspended beneath said electrode to receive the matter falling therefrom, substantially as described.

In testimony whereof I have hereunto set my hand in the presence of two subscribing witnesses.

ABRAHAM V. MESEROLE.

Witnesses:
T. H. PALMER,
G. M. BORST.